INVENTOR.
JAY B. MALIN

Patented Feb. 17, 1953

2,628,600

UNITED STATES PATENT OFFICE 2,628,600

CONTROL OF THE IGNITION MEANS IN INJECTION TYPE INTERNAL-COMBUSTION ENGINES

Jay B. Malin, Whittier, Calif., assignor to The Texas Company, New York, N. Y., a corporation of Delaware Application December 22, 1948, Serial No. 66,636

3 Claims. (Cl. 123—32)

This invention relates to an internal combustion engine of the reciprocating piston type operating with fuel injection and glow-wire ignition, and particularly to an engine of this type, wherein combustion is independent of the spontaneous ignition quality of the fuel employed, and knocking of the engine is prevented.

In the co-pending application of Everett M. Barber, Serial No. 10,598, filed February 25, 1948, now Patent No. 2,484,009, dated October 11, 1949, there is disclosed and claimed the method of and engine construction for carrying out this non-knocking combustion. In accordance with that application, fuel is injected into a localized portion of compressed air within the cylinder combustion space toward the latter part of the piston compression stroke, the first increment of injected fuel is electrically ignited by spark or glow-wire ignition adjacent the locus of fuel injection substantially as soon as combustible fuel vapor-air mixture is formed therefrom to establish a flame front, and fuel injection is then continued on each cycle following ignition to impregnate additional portions of the compressed air immediately in advance of the flame front, while moving the compressed air and locus of fuel injection relatively to each other in an orderly manner so as to form progressively additional portions of combustible fuel vapor-air mixtures which are ignited by the flame front and burned substantially as rapidly as formed to develop the power required on each cycle in accordance with the load on the engine. In this manner there is an insufficient accumulation in the combustion space on any cycle of unburned combustible mixture trapped by the advancing flame front as to be susceptible to spontaneous ignition, and knocking of the engine is prevented irrespective of the quality of the fuel used or the compression ratio and mixture density employed.

The present invention is particularly adapted for use in a non-knocking combustion method and engine of this character operating with glow-wire ignition. It has been found necessary to supply the ignition plug of the glow-wire type with a flow of electric current from an exterior source of electrical energy in order to insure proper ignition on each cycle. However, where a steady flow of electric current is maintained through the glow-wire, such as to heat the latter to a glowing temperature sufficient to insure ignition during starting or at low loads of the engine, it is found that the heat developed during continued operation of the engine under heavy load may be sufficient to damage or even burn out the ignition plug.

One of the principal objects of the present invention is to provide a method of and engine construction for operating with fuel injection and glow-wire ignition, wherein the current flow through the glow-wire of the ignition plug is varied inversely with the engine load in order to secure long continued and dependable service of the glow-wire ignition.

Another object of the invention is to provide in a non-knocking combustion method and engine operating with glow-wire ignition, an automatic control for the current flow through the glow-wire in accordance with the setting of the engine throttle or in accordance with the temperature within the combustion space immediately adjacent the locus of glow-wire ignition.

Still another object of the present invention is to provide an improved method of and engine construction for operation with glow-wire ignition, wherein the current flow through the glow-wire on succeeding cycles is varied in accordance with engine load by increasing the current flow as the load decreases and vice versa, and at the same time full current flow through the glow-wire with wide open throttle is provided for starting of the engine.

Other objects and advantages of the present invention will be apparent from the following description when taken in conjunction with the appended claims and attached drawing.

In the drawing, which illustrates preferred embodiments of the present invention:

Figure 1:
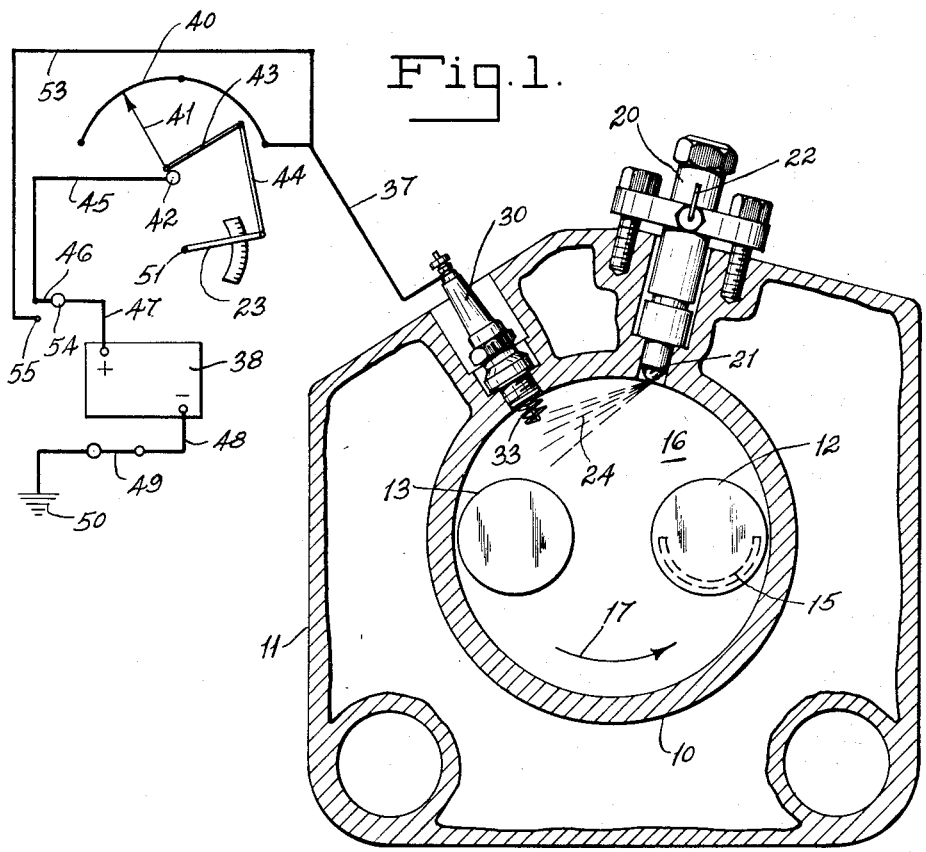
Fig. 1 is a horizontal sectional view through a cylinder of the engine looking upwardly toward the cylinder head, with the glow-wire ignition and engine throttle control illustrated diagrammatically.

Referring more particularly to Fig. 1, the engine cylinder is indicated at 10 with water jacket 11, air intake valve 12 and exhaust valve 13. It will be understood that the engine is of the reciprocating piston type having a piston (not shown) operating within cylinder 10, with connecting rod extending to the usual crank shaft in conventional manner. As shown, the air intake valve 12 is provided with a shroud 15 set tangentially of the disc-shaped combustion space 16 to impart a high velocity swirling movement to the air in the direction of the arrow 17, as the air is introduced into the cylinder. The succeeding compression stroke of the piston then compresses this air within the disc-shaped combustion space 16 while the high velocity swirling movement of the air is maintained.

Mounted in the cylinder wall is a fuel injection nozzle 20 having a nozzle tip 21 positioned at the periphery of the combustion space 16. It will be understood that the injection nozzle 20 is connected by the usual injection line 22 with a conventional fuel pump driven in synchronism with the engine and provided with the customary pump plunger and controls for regulating the beginning and duration of injection on each cycle in accordance with engine load. For example, the fuel pump may be of the conventional cam-operated plunger type wherein the plunger is equipped with a helix cooperating with ports in the pump cylinder wall to control the beginning and end of injection on each cycle, the plunger being also rotatable under suitable rack control to change the position of the helix with respect to the ports to alter thereby the duration of injection in accordance with engine load. The engine is also equipped with the customary throttle 23 interconnected with the said rack control of the pump in conventional manner. The fuel injection nozzle 20 is also equipped in conventional manner with a spring pressed needle or pintle valve which opens under injection line pressure to cause discharge of the fuel through a fuel port located in the nozzle tip 21 so as to direct the fuel spray 24 into a localized portion of the compressed swirling air at one side of the combustion space 16 and in the direction of air swirl. Fuel injection may be initiated on each cycle about 70–25° before top dead center, generally about 60–45° for full load operation when the spray 24 continues for one complete rotation of the compressed air within the combustion space 16, with an air swirl velocity of about 6–8 rotations per engine revolution.

Figure 2:
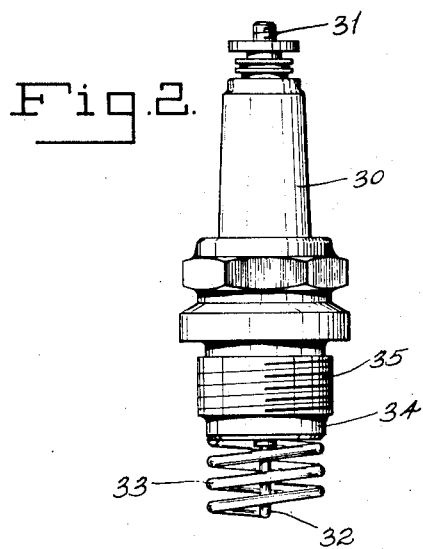
Fig. 2 is an enlarged elevational view of a glow-wire ignition plug employed in connection with the present invention.

Also mounted in the cylinder wall adjacent the locus of fuel injection, such as less than 90 angular degrees and generally about 30–45 angular degrees around the combustion space from the nozzle tip 21, is a glow plug indicated generally at 30. The latter is more particularly illustrated in Fig. 2. As shown therein, the ignition plug is similar to conventional spark plug construction except for the fact that the central terminal 31, which is insulated electrically from body 34, is connected to a continuous wire coil instead of the usual electrode. Thus, one end of the wire coil is provided with a centrally arranged depending portion 32 which extends upwardly for electrical connection with the insulated terminal 31, the remainder of the wire being formed into the coil 33 with the end thereof fastened to the body 34 of the plug which is grounded to the engine as the plug is inserted into its threaded socket formed in the cylinder wall and which receives externally threaded portion 35 of the plug. The continuous coil thus constitutes a flow path of high resistance for the continuous flow of electric current when terminal 31 is connected by lead 37 to an external source of electrical energy, shown diagrammatically as the storage battery 38. The resistance coil of the plug may be formed, for example, of about 5 to 12 inch lengths of No. 12–18 Nichrome wire, such that a current flow of about 15–30 amperes through the coil provides a temperature sufficient to insure ignition on each cycle.

As shown in Fig. 1, the coil or glow wire 33 of the plug is in position to be contacted by the first increment of injected fuel at an edge of spray 24 substantially as soon as combustible fuel vapor-air mixture is formed therefrom and will ignite said fuel vapor-air mixture which will, in turn, immediately establish a flame front which extends generally radially from the locus of the coil across the spray at one side of the combustion space. This flame front travels at high velocity counter to the air swirl; but due to the air swirl velocity and the fact that the mixture closer to the nozzle tip 21 becomes increasingly and incombustibly rich, the flame front generally remains in a relatively fixed position with respect to the cylinder wall, glow plug and fuel injection nozzle. Consequently, during continuation of spray 24 following ignition on any cycle, that spray will thereby be injected into succeeding increments of the rapidly swirling compressed air immediately in advance of the flame front, and the resulting additional portions of progressively formed combustible mixtures will be ignited by the flame front and burned substantially as rapidly as formed.

In accordance with the present invention, the electrical circuit of the glow plug 30 includes a variable resistor element 40. Where the circuit is D. C., it will be understood that the resistor element 40 will constitute a variable resistance; whereas, when the circuit is A. C. as may be conventionally supplied by the customary transformer and secondary circuit, the variable resistor element will constitute a variable transformer. The language "resistor element" which has a "movable member effective to increase or decrease the amount of resistance to current flow connected in the electrical circuit" is employed as a matter of convenience in the following description and claims to include either of the above-described arrangements. As illustrated, the lead 37 is connected to the variable resistance arc over which swings the movable conductor 41 pivoted at 42. The arm 41 is in turn rigidly attached to arm 43, which is non-conductive electrically and to which is pivoted one end of link 44, the opposite end thereof being in turn pivoted to the throttle 23.

Movable conductor 41 is in turn electrically connected through pivot 42 with a lead 45, two-way switch 46 and lead 47 with the positive pole of the storage battery 38. The negative pole of the latter is in turn connected by lead 48 through cut out switch 49 to ground 50.

In operation, as the load on the engine increases, throttle 23 is swung upwardly about its pivot 51 to increase the duration of fuel injection from nozzle 20 on each cycle to compensate for increasing load. Simultaneously, through the interconnection including link 44 and lever arm 43, the movable conductor 41 is swung to the left to insert additional resistance in the circuit from source 38 to plug 30 to cause thereby a decreased flow of current through glow wire 33. The net result is that the increased heat of combustion within the combustion space is offset by the decreased current flow through the glow-wire to maintain the glow-wire at a fairly uniform temperature, or at least to prevent it from being heated to an excessively high temperature which would result in premature failure thereof. Conversely, as the load on the engine decreases, throttle 23 is swung downwardly, thereby swinging conductor 41 to the right to cut out resistance and increase the flow of electric current through glow-wire 33.

The foregoing construction provides for the proper maintenance of the flowing temperature of glow-wire 33 for variable load of the engine after the latter is in operation. However, for prestarting of the engine from the cold, full current flow through the glow-wire with wide open throttle is required. For this purpose a by-pass circuit 53 around the resistor element 40 is provided. As shown, the two-way switch 46 is adapted to be thrown about its pivot 54 to disconnect lead 45 and to connect lead 47 with switch terminal 55 of the by-pass lead 53, the opposite end of which is connected to conductor 37. This enables throttle 23 to be moved to fully open position and yet full current flow through glow-wire 33 is obtained by reason of the by-pass lead 53 which cuts out the resistor element 40 entirely. When the engine has started and has been brought up to speed or proper operating temperature, the two-way switch 46 is then thrown to disconnect the by-pass circuit 53 and to connect with lead 45 to throw the resistor element 40 into the circuit for normal operation.

Figure 3:
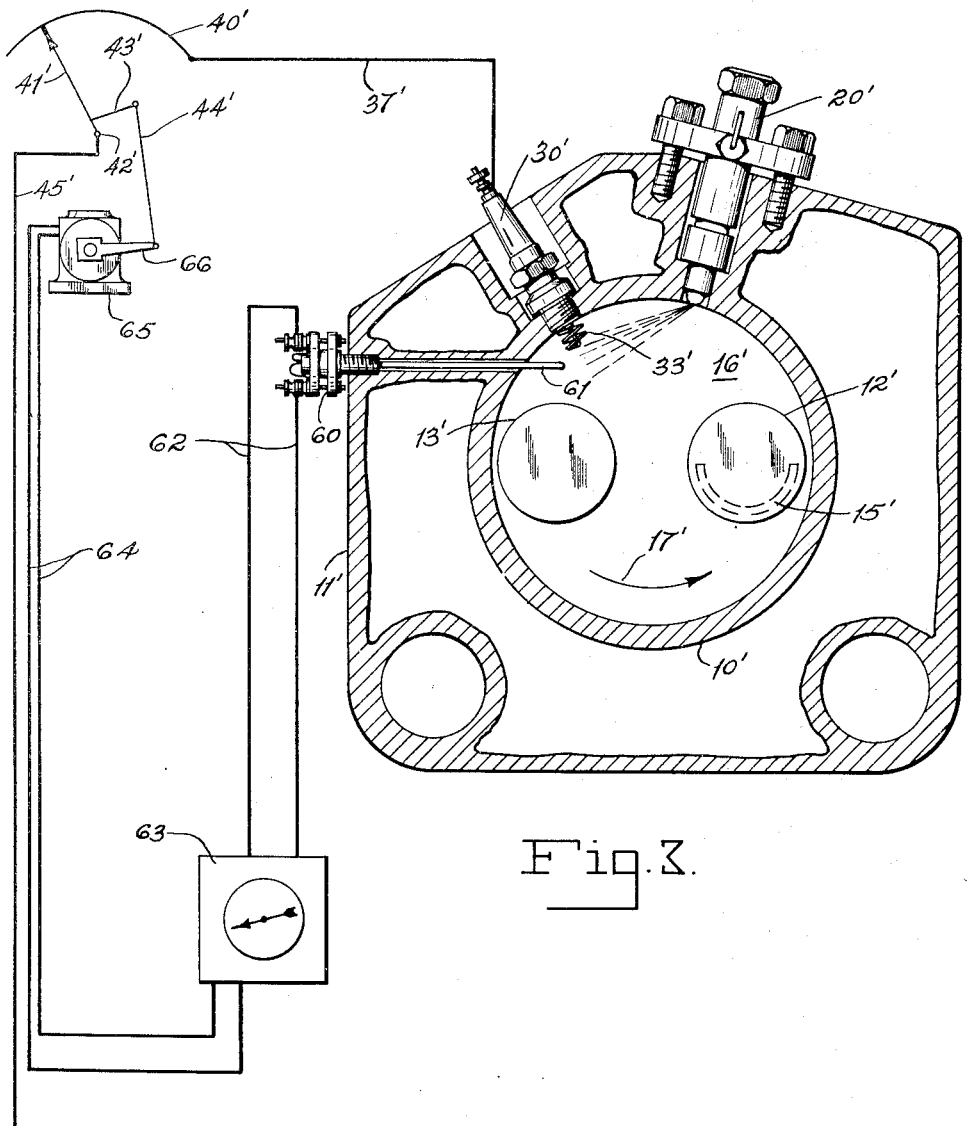
Fig. 3 is a view similar to Fig. 1 of a modification, wherein the glow-wire ignition is regulated by a thermocouple and servo-motor control responsive to the combustion space temperature.

The modification illustrated in Fig. 3 also functions to vary the current flow through the glow-wire inversely in accordance with engine load in the manner of Fig. 1; but in this case, the automatic control is made responsive to the temperature existing in the combustion space immediately adjacent the glow-wire. In Fig. 3 similar elements to Fig. 1 are denoted by the same numerals except that the numerals are primed. In this case a thermocouple indicated generally at 60 is mounted in the cylinder wall with the tip 61 thereof immediately adjacent the glow-wire 33¹ within the combustion space 16¹.

Thermocouple 61 is connected by leads 62 with a servo-motor control mechanism 63. The control mechanism is essentially a well known potentiometer type of instrument which is manufactured commercially by various companies. The output of the control mechanism 63 is proportional to the signal originated by thermocouple 60 and is transmitted by means of leads 64 to a conventional type of servo-motor 65 which mounts and controls the position of arm 66. The servo-motor and control mechanism are generally sold as a unit; and as this is a readily available conventional mechanism, no further description thereof is required. The link 44¹ is connected to arm 66 in such a manner that when the arm 66 is moved by servo-motor 65, the motion is transmitted through link 44¹ to cause electrically non-conducting arm 43¹ to swing about fulcrum 42¹ and move arm 41¹ across the resistance 40¹.

In operation of the embodiment of Fig. 3, as the temperature within the combustion space 16¹ adjacent the glow-wire 33¹ rises with increasing load on the engine, the thermocouple 61 responsive to that temperature change increases the input signal to servo-motor control mechanism 63. The balancing system of the control mechanism 63 moves to rebalance the new signal from thermocouple 61 and, in doing so, alters the output system of the control mechanism 63 by a proportionate amount. The output is transmitted by leads 64 to servo-motor 65 and causes it to rotate counter-clockwise to a position determined by the new output. Arm 66 is also caused to move in counter-clockwise direction since it is connected rigidly to shaft of servo-motor 65. The motion of arm 66 is transmitted through link 44¹ and insulated lever arm 43¹ to swing the movable conductor 41¹ to the left. This adds additional resistance in the electric circuit of the igniter plug 30¹, thereby decreasing the current flow through glow-wire 33¹ and tending to maintain the temperature of that glow wire at a predetermined optimum or below a destructive level. Conversely, as the temperature within the combustion space falls with decreasing load on the engine, thermocouple 61 acts through servo-motor control mechanism 63 and servo-motor 64 to lower arm 65 and swing conductor 41¹ to the right to reduce thereby the resistance in the electric circuit and increase the current flow through glow-wire 33¹. In this form of the invention, when the engine is being started from the cold, it will be appreciated that thermocouple 61 has effected the swinging movement of conductor 41¹ to its extreme right hand position to provide for full current flow through the glow-wire 33¹. Moreover, since there is no positive interconnection with the engine throttle, there is no necessity for a by-pass circuit as in the modification of Fig. 1.

The following example is given to illustrate the present invention. A modified C. F. R. engine constructed in accordance with Fig. 1 was operated under the following conditions:

| | |
|---|---|
| Speed | 1800 R. P. M. |
| Compression ratio | 10:1 |
| Fuel | Gasoline of about 20 CFRM octane number |
| Manifold pressure | 30 inches mercury absolute |
| Jacket temperature | 212° F. |
| Injection advance | 49° BTC |

An ignition plug was employed having a ⅝.. diameter glow-wire coil of 10 9/16" total length formed of No. 16 Nichrome wire having a resistance of about 0.25 ohm per foot. The glow plug was connected in a 220 volt A. C. circuit containing an adjustable transformer of 30 ampere capacity, the current in the circuit being measured by an ammeter. The engine was operated under the above listed conditions at various loads in order to determine the minimum current flow through the glow-wire for the various loads which provided steady operation, thereby indicating proper ignition on each cycle. Since at full load substantially the entire quantity of air within the combustion space is impregnated with fuel on each cycle, whereas at lower loads successively lesser portions of the swirling air are impregnated on each cycle, the load on the engine is properly expressed by the overall fuel-air ratio of the combustion space as measured by the quantity of fuel injected for each particular load condition. The following data were obtained in the runs at the various loads as described above:

| Fuel-Air Weight Ratio | Minimum Amperes |
|---|---|
| .096 | 22 |
| .067 | 25 |
| .048 | 28 |
| .019 | 30 |

The foregoing data show that at approximately full load as represented by a fuel-air weight ratio of .096, the current flow of 22 amperes through the glow-wire was sufficient to maintain steady engine operation. At progressively reduced loads, the minimum current flow through the glow-wire which maintained steady operation progressively increased until at a light load approximating idling, as represented by an over-all fuel-air ratio of .019, a current flow through the glow-wire of 30 amperes was required.

It will be understood that the automatic control is set in accordance with the characteristics of the particular engine and electrical circuit to maintain a current flow through the glow-wire which is at all times somewhat above the minimum required for steady operation, while at the same time preventing destructive temperature rise of the glow wire. While in the foregoing description, a non-knocking engine employing air swirl with a fixed locus of injection has been set forth, it will be understood that the present invention can also be utilized in connection with the modified types of non-knocking engines illustrated in the said application Serial No. 10,598 where the air does not swirl, but the locus of fuel injection is moved progressively about or around the combustion space so as to lead the flame front throughout that portion of the combustion space as determined by the load on the engine. Moreover, while the invention has been described as being particularly useful in connection with this type of non-knocking combustion process and engine, it will be understood that the invention is also applicable to other types of fuel injection engines operating with positive ignition as distinguished from compression ignition.

In addition to dependable service over long periods of operation, several other distinct advantages are realized by the use of the present invention. In connection with the non-knocking combustion operation, the critical timing requirements encountered with spark ignition are obviated, and small variations in injection timing and fuel-air mixtures on succeeding cycles are not apt to cause detonation due to ignition failures. Further, the controlled glow-wire ignition in aircraft application of the present invention is not subject to the high tension line leakages experienced in present airplanes at high altitudes, thereby eliminating interference with radio and radar reception. Finally, the difficulty experienced with spark ignition engines in tractor service as a result of magneto fouling with dust and other foreign materials, frequently resulting in shut-down, is eliminated by the controlled glow-wire ignition.

Obviously many modifications and variations of the invention as above set forth may be made without departing from the spirit and scope thereof, and therefore only such limitations should be imposed as are indicated in the appended claims.

I claim:

1. In an internal combustion engine having a cylinder providing a combustion space, the combination of an ignition plug having a glow-wire mounted in said cylinder with the glow-wire within said combustion space, an external source of electrical energy, an electrical circuit including electrical connections from said source to the glow-wire of said plug adapted to cause a flow of electric current through said glow-wire to heat the same to a glowing temperature sufficient to produce ignition of combustible fuel vapor-air mixture in said combustion space, an adjustable variable resistor element in said electrical circuit having a movable member for varying the amount of resistance to current flow connected in said electrical circuit, a control for the quantity of fuel supplied per cycle to said combustion space, and an operative interconnection between said control and said movable member for automatically decreasing the amount of resistance to current flow connected in said electrical circuit as said control is actuated to decrease the amount of fuel supplied per cycle to said combustion space, and for automatically increasing the amount of resistance to current flow connected in said circuit as said control is actuated to increase the amount of fuel supplied per cycle to said combustion space.

2. The combination in an internal combustion engine according to claim 1, including a by-pass circuit around said resistor element, and a two-way switch for connecting said source directly with said glow-wire through said by-pass circuit while disconnecting said resistor element, whereby full current may be passed through said glow-wire while said control is set for maximum fuel supply per cycle for starting said engine.

3. In an internal combustion engine having a cylinder and reciprocating piston operating therein providing a disc-shaped combustion space, means for introducing air into the said cylinder in a manner to impart a high velocity swirling movement whereby the air is compressed by the piston into the disc-shaped combustion space while maintaining the high velocity swirling movement thereof, fuel injection means including a fuel injection nozzle mounted in said cylinder and adapted to inject fuel into a localized portion of the compressed swirling air at one side of the disc-shaped combustion space toward the latter part of the piston compression stroke, an ignition plug having a glow-wire mounted in said cylinder adjacent said locus of fuel injection so as to be contacted by the first increment of injected fuel on each cycle substantially as soon as combustible fuel vapor-air mixture is formed therefrom, whereby said combustible mixture is ignited to establish a flame front traveling counter to the air swirl, and means for controlling the duration of injection on each cycle in accordance with load on the engine whereby fuel injection is continued after ignition into additional portions of the compressed swirling air immediately in advance of the traveling flame front so as to form progressively additional portions of combustible fuel vapor-air mixtures which are ignited by the flame front and burned substantially as rapidly as formed; the combination of an external source of electrical energy, an electrical circuit including electrical connections from said source to the glow-wire of said ignition plug adapted to cause a flow of electric current through said glow-wire to heat the same to a glowing temperature, an adjustable variable resistor element in said electrical circuit having a movable member for varying the amount of the resistance to current flow connected in said electrical circuit, and an operative interconnection between said controlling means and said movable member for automatically increasing the amount of resistance to current flow connected in said electrical circuit as said controlling means is actuated to increase the duration of injection per cycle, and for automatically decreasing the amount of resistance to current flow connected in said circuit as said controlling means is actuated to decrease the duration of injection per cycle.

JAY B. MALIN.

REFERENCES CITED

The following references are of record in the file of this patent:

UNITED STATES PATENTS

| Number | Name | Date |
|---|---|---|
| 1,432,214 | Sperry | Oct. 17, 1922 |
| 1,948,974 | Talmey | Feb. 27, 1934 |
| 1,988,754 | Sleffel | Jan. 22, 1935 |
| 2,007,508 | Talmey | July 9, 1935 |
| 2,411,740 | Malin | Nov. 26, 1946 |
| 2,412,821 | Malin et al. | Dec. 17, 1946 |
| 2,484,009 | Barber | Oct. 11, 1949 |